United States Patent
Yamamoto et al.

(10) Patent No.: US 9,388,262 B2
(45) Date of Patent: Jul. 12, 2016

(54) PROCESS FOR PRODUCING FLUORINATED OLEFIN/VINYL ALCOHOL COPOLYMER AND FILM MADE BY FORMING A COMPOSITION CONTAINING THE COPOLYMER

(71) Applicant: ASAHI GLASS COMPANY, LIMITED, Chiyoda-ku (JP)

(72) Inventors: Hiromasa Yamamoto, Tokyo (JP); Tatsuya Yamamoto, Tokyo (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 31 days.

(21) Appl. No.: 14/196,444

(22) Filed: Mar. 4, 2014

(65) Prior Publication Data

US 2014/0187728 A1   Jul. 3, 2014

Related U.S. Application Data

(63) Continuation of application No. PCT/JP2012/075852, filed on Oct. 4, 2012.

(30) Foreign Application Priority Data

Oct. 5, 2011 (JP) ................. 2011-220920

(51) Int. Cl.
| | |
|---|---|
| *C08F 8/12* | (2006.01) |
| *C08F 214/26* | (2006.01) |
| *C08F 2/26* | (2006.01) |
| *C08F 214/18* | (2006.01) |
| *C08J 5/18* | (2006.01) |
| *C08F 216/06* | (2006.01) |

(52) U.S. Cl.
CPC ............... *C08F 214/267* (2013.01); *C08F 2/26* (2013.01); *C08F 214/18* (2013.01); *C08F 214/182* (2013.01); *C08J 5/18* (2013.01); *C08F 216/06* (2013.01)

(58) Field of Classification Search
USPC .................................. 526/214, 255
See application file for complete search history.

(56) References Cited

U.S. PATENT DOCUMENTS

| | | | | |
|---|---|---|---|---|
| 5,032,656 A * | 7/1991 | Mares | ................. | C08F 214/186 526/255 |
| 5,070,162 A * | 12/1991 | Oxenrider | ........... | C08F 214/186 526/216 |
| 5,137,999 A * | 8/1992 | Oxenrider | ........... | C08F 214/186 526/216 |
| 5,151,477 A * | 9/1992 | Oxenrider | ........... | C08F 214/186 526/212 |
| 5,173,556 A * | 12/1992 | Mares | ................. | C08F 214/186 525/60 |
| 5,641,608 A * | 6/1997 | Grunwald | ............. | B41C 1/1008 101/465 |
| 2005/0136356 A1 * | 6/2005 | Van Damme | ......... | B41C 1/1008 430/270.1 |

FOREIGN PATENT DOCUMENTS

| | | |
|---|---|---|
| JP | 2-502832 | 9/1990 |
| JP | 5-261256 | * 10/1993 |
| JP | 05-261256 | * 10/1993 |
| JP | 6-1876 | 1/1994 |
| JP | 3286696 | 3/2002 |
| JP | 2009-290687 | 12/2009 |
| WO | 00/22002 | 4/2000 |
| WO | 2011/126056 | 10/2011 |
| WO | WO-2011/126056 A1 | * 10/2011 |

OTHER PUBLICATIONS

International Search Report issued Dec. 11, 2012 in PCT/JP2012/075852 filed Oct. 4, 2012.
"Vinyl Acetate and Vinyl Alcohol Copolymer with Tetrafluoroethyulene" M. Modena, et al. Montecatini Edison S.p.A., Laboratorio Ricerche, Bollate (Milano) Italy 1996.

* cited by examiner

*Primary Examiner* — Peter D Mulcahy
*Assistant Examiner* — Henry Hu
(74) *Attorney, Agent, or Firm* — Oblon, McClelland, Maier & Neustadt, L.L.P

(57) ABSTRACT

A process for producing a fluorinated olefin/vinyl alcohol copolymer, which comprises emulsion polymerizing a fluorinated olefin and a vinyl ether in the presence of an aqueous medium and an emulsifier and converting the repeating units based on the vinyl ether to the vinyl alcohol.

10 Claims, No Drawings

PROCESS FOR PRODUCING FLUORINATED OLEFIN/VINYL ALCOHOL COPOLYMER AND FILM MADE BY FORMING A COMPOSITION CONTAINING THE COPOLYMER

TECHNICAL FIELD

The present invention relates to a process for producing a fluorinated olefin/vinyl alcohol copolymer and a film made by forming a composition containing the copolymer.

BACKGROUND ART

A fluorinated olefin/vinyl alcohol copolymer, i.e. a copolymer of a fluorinated olefin and vinyl alcohol, is used as a raw material for coating resins, a material for gas/liquid separation membranes, a gas barrier material, a sealing material for solar cells, a material for various surface protective sheets, a hydrophilic porous material, etc. (Patent Documents 1 and 2). As a method for producing a fluorinated olefin/vinyl alcohol copolymer, a method has already been known wherein a fluorinated olefin and vinyl acetate are copolymerized, followed by hydrolysis under an acidic or basic condition (Patent Documents 1 and 2, and Non-Patent Document 3).

PRIOR ART DOCUMENTS

Patent Documents

Patent Document 1: JP-A-5-261256
Patent Document 2: JP-A-6-1876

Non-Patent Document

Non-Patent Document 1: M. Ragazzini et. al., Eur. Polym. J., 3, 5 (1967)

DISCLOSURE OF INVENTION

Technical Problem

According to knowledge of the present inventors, the fluorinated olefin/vinyl alcohol copolymers obtained by the methods described in Patent Documents 1 and 2 and Non-Patent Document 1 have a low thermal decomposition starting temperature, and their thermal stability is insufficient. Further, if a copolymer of a fluorinated olefin and vinyl acetate is hydrolyzed under acid condition, the reaction rate is low, and the productivity deteriorates. If a copolymer of a fluorinated olefin and vinyl acetate is hydrolyzed under basic condition, although the rate of the hydrolysis is high, the main chain is decomposed by bases, and a copolymer to be obtained is fragile.

It is an object of the present invention to provide a fluorinated olefin/vinyl alcohol copolymer having a high molecular weight and which is excellent in the thermal stability and which can be formed into a strong film, with high productivity.

Solution To Problem

The present invention provides a process for producing a fluorinated olefin/vinyl alcohol copolymer and a film made by forming a composition containing the copolymer, which have the following constructions [1] to [10].

[1] A process for producing a fluorinated olefin/vinyl alcohol copolymer, which comprises the following steps (1) and (2):

Step (1): a step of emulsion polymerizing a fluorinated olefin represented by the following formula (1) and a vinyl ether represented by the following formula (2) in the presence of an aqueous medium and an emulsifier to obtain a fluorinated olefin/vinyl ether copolymer, wherein the mass ratio of the vinyl ether represented by the formula (2) to the aqueous medium is from 5/95 to 70/30:

$$CF_2=CFX^1 \quad (1)$$

$$CH_2=CHOR^1 \quad (2)$$

wherein in the formula (1), $X^1$ is a fluorine atom, a chlorine atom, a trifluoromethyl group or $-OC_aF_{2a+1}$ (wherein a is an integer of from 1 to 3), and in the formula (2), $R^1$ is a group selected from the group consisting of a $C_{4-12}$ tertiary alkyl or alkoxyalkyl group, a $C_{4-6}$ alicyclic hydrocarbon group which has an etheric oxygen atom, a $C_{6-10}$ aryl group and $-Si(R^5)_3$ (wherein $R^5$ is a $C_{1-10}$ alkyl group or an aryl group); and Step (2): a step of substituting by a hydrogen atom, $R^1$ in repeating units based on the vinyl ether represented by the formula (2) in the fluorinated olefin/vinyl ether copolymer to obtain a fluorinated olefin/vinyl alcohol copolymer.

[2] The process for producing a fluorinated olefin/vinyl alcohol copolymer according to the above [1], wherein $R^1$ is a t-butyl group.

[3] The process for producing a fluorinated olefin/vinyl alcohol copolymer according to the above [1] or [2], wherein the step (2) is carried out in the presence of an acid.

[4] The process for producing a fluorinated olefin/vinyl alcohol copolymer according to any one of the above [1] to [3], wherein in the fluorinated olefin/vinyl ether copolymer obtained in the step (1), the molar ratio of the repeating units based on the fluorinated olefin represented by the formula (1) to the repeating units based on the vinyl ether represented by the formula (2) is from 40/60 to 60/40.

[5] The process for producing a fluorinated olefin/vinyl alcohol copolymer according to any one of the above [1] to [4], wherein in the step (1), a vinyl ether represented by the following formula (3) is further copolymerized:

$$CH_2=CHOR^6 \quad (3)$$

wherein $R^6$ is a group selected from the group consisting of a $C_{1-6}$ primary or secondary alkyl group and a $C_{6-12}$ cycloalkyl group, which may be substituted by a hydroxy group or a fluorine atom.

[6] The process for producing a fluorinated olefin/vinyl alcohol copolymer according to any one of the above [1] to [5], wherein the emulsifier is a compound represented by the following formula (4):

$$R^7-(CH_2)_n-COOX^2 \quad (4)$$

wherein $R^7$ is a $C_{1-9}$ perfluoroalkyl group which may have an etheric oxygen atom, n is an integer of from 0 to 2, and $X^2$ is a hydrogen atom, $NH_4$ or an alkaline metal atom.

[7] The process for producing a fluorinated olefin/vinyl alcohol copolymer according to any one of the above [1] to [6], wherein the step (1) is carried out in the presence of a basic compound.

[8] The process for producing a fluorinated olefin/vinyl alcohol copolymer according to any one of the above [1] to [7], wherein the fluorinated olefin/vinyl alcohol copolymer has a weight average molecular weight of from 50,000 to 1,000,000.

[9] A film made by forming a composition comprising the fluorinated olefin/vinyl alcohol copolymer obtained by the production process as defined in any one of the above [1] to [8].

[10] The film according to the above [9], wherein the forming is a casting method.

Advantageous Effects of Invention

According to the present invention, the fluorinated olefin/vinyl alcohol copolymer having a high alternating copolymerizability of the repeating units based on the fluorinated olefin and the repeating units based on the vinyl alcohol and a high molecular weight can be produced with high productivity. The fluorinated olefin/vinyl alcohol copolymer to be obtained can be formed into a strong film which has an excellent thermal stability.

DESCRIPTION OF EMBODIMENTS

In this specification, "monomer" is a compound which is used for polymerization and constitutes repeating units after the polymerization.

Process for Producing a Fluorinated Olefin/Vinyl Alcohol Copolymer

The process for producing a fluorinated olefin/vinyl alcohol copolymer of the present invention (hereinafter referred to as "the copolymer (A)") comprises the following step (1) and step (2):

Step (1): a step of emulsion polymerizing a fluorinated olefin (hereinafter may be referred to as "fluorinated olefin (1)") represented by the above formula (1) and a vinyl ether (hereinafter may be referred to as "vinyl ether (2)") represented by the above formula (2) in the presence of an aqueous medium and an emulsifier to obtain a fluorinated olefin/vinyl ether copolymer, wherein the mass ratio of the vinyl ether (2) to the aqueous medium is from 5/95 to 70/30; and Step (2): a step of substituting by a hydrogen atom, $R^1$ in repeating units based on the vinyl ether (2) in the fluorinated olefin/vinyl ether copolymer to obtain a fluorinated olefin/vinyl alcohol copolymer.

According to the process of the present invention, the alternating copolymerizability is high, and a fluorinated olefin/vinyl alcohol copolymer having a weight average molecular weight of from 50,000 to 1,000,000 can be obtained. Because, the vinyl ether is used, and the emulsion polymerization is carried out, whereby the decrease of the molecular weight due to the chain transfer reaction is low. Now, respective steps will be described in detail.

Step (1)

In the production process of the present invention, as the fluorinated olefin (1), a compound represented by the above formula (1) is used.

A specific example of the fluorinated olefin (1) may, for example, be tetrafluoroethylene, chlorotrifluoroethylene, hexafluoropropylene or a perfluoropropylvinyl ether. Among them, tetrafluoroethylene or chlorotrifluoroethylene is preferred, and tetrafluoroethylene is particularly preferred, whereby the heat resistance will be excellent. As the fluorinated olefin (1), one type may be used alone, or two or more types may be used in combination.

In the production process of the present invention, as the vinyl ether (2), a compound represented by the above formula (2) is used.

In the above formula (2), $R^1$ is a group selected from the group consisting of a $C_{4-12}$ tertiary alkyl or alkoxyalkyl group, a $C_{4-6}$ alicyclic hydrocarbon group which has an etheric oxygen atom, a $C_{6-10}$ aryl group and —Si$(R^5)_3$ wherein $R^5$ is a $C_{1-10}$ alkyl group or aryl group). Among them, from the viewpoint of availability, the tertiary alkyl group, particularly a tertiary alkyl group represented by —C$R^2R^3R^4$ (each of $R^2$, $R^3$, and $R^4$ which are independent of one another is a $C_{1-3}$ alkyl group), a methyl group substituted by a $C_{1-6}$ alkoxy group, a tetrahydrofuryl group, a tetrahydropyranyl group or a trialkylsilyl group wherein $R^5$ is a $C_{1-6}$ alkyl group or aryl group is preferred, and the tertiary alkyl group represented by —C$R^2R^3R^4$ is particularly preferred.

As the vinyl ether (2), t-butyl vinyl ether, 1,1-dimethylpropyl vinyl ether, methoxymethyl vinyl ether, tetrahydrofuryl vinyl ether, tetrahydropyranyl vinyl ether, vinyloxytrimethylsilane or vinyloxydimethylphenylsilane is preferred, and from the viewpoint of availability, t-butyl vinyl ether is particularly preferred. As the vinyl ether (2), one type may be used alone, or two or more types may be used in combination.

The mass ratio of the vinyl ether (2) to the aqueous medium is from 5/95 to 70/30, preferably from 10/90 to 50/50, particularly preferably from 10/90 to 35/65. If the amount of the vinyl ether is at least the above lower limitation, the polymerization reaction proceeds, and if the amount of the vinyl ether is at most the above upper limitation, the emulsion state can be stably maintained.

The fluorinated olefin (1) and the vinyl ether (2) have high alternating copolymerizability, and therefore, the alternating copolymerization ratio of the obtainable fluorinated olefin/vinyl ether copolymer (hereinafter may be referred to as "copolymer (B)") becomes at least 95% as calculated by probability calculation from the copolymerization reactivity ratio of them. The alternating copolymerization ratio is the percentage of the number of combinations where polymerized units based on different monomers are adjacent to each other, based on the total number of combinations of adjacent two polymerized units. For example, in a case where the copolymer (B) is a copolymer represented by 12122121212 (wherein 1 is a repeating unit based on the fluorinated olefin (1), and 2 is a repeating unit based on the vinyl ether (2)), the total number of combinations of adjacent two polymerized units is 10, and the number of combinations where polymerized units based on different monomers are adjacent to each other, is 9, and therefore, the alternating copolymerization ratio is 90%.

Since the alternating copolymerization ratio of the copolymer (B) is at least 95%, the copolymer (A) having an alternating copolymerization ratio of the repeating units based on the fluorinated olefin (1) and the repeating units based on the vinyl alcohol (2) being at least 95%, can be obtained. In the copolymer (A) having such a high alternating copolymerization ratio, the repeating units based on the fluorinated olefin (1) and the repeating units based on the vinyl alcohol (2) are uniformly arranged, whereby the heat resistance, the weather resistance and the water resistance are excellent. Further, for example, in a case where a curing agent is to be reacted to hydroxy groups in the copolymer (A) to form a cured product, the reactivity of hydroxy groups is more stabilized, since the hydroxy groups are uniformly distributed.

In step (1), in addition to the fluorinated olefin (1) and the vinyl ether (2), a vinyl ether (hereinafter may be referred to as "vinyl ether (3)") represented by the following formula (3) may further be copolymerized:

$$CH_2=CHOR^6 \qquad (3)$$

wherein $R^6$ is a group selected from the group consisting of a $C_{1-6}$ primary or secondary alkyl group and a $C_{6-12}$ cycloalkyl group, which may be substituted by a hydroxy group or a fluorine atom.

The vinyl ether (3) is a vinyl ether having $R^6$ which is inactive in the subsequent step (2). "$R^6$ is inactive in step (2)" means that $R^6$ will not be changed under the reaction condition for substituting R' in the vinyl ether (2) by a hydrogen atom. However, $R^6$ may be an active group under conditions other than the reaction condition for substituting R' by a hydrogen atom. When the vinyl ether (3) is used, in step (2), $R^6$ in repeating units based on the vinyl ether (3) will not be changed, and the repeating units based on the vinyl ether (3) in a copolymer (A) to be obtained are maintained as they are.

$R^6$ in the vinyl ether (3) is preferably a $C_{1-6}$ primary or secondary alkyl group or the alkyl group of which at least one hydrogen atom is substituted by a substituent. The substituent is preferably a hydroxy group or a fluorine atom.

A specific example of the vinyl ether (3) may, for example, be an alkyl vinyl ether such as methyl vinyl ether, ethyl vinyl ether, n-butyl vinyl ether, isobutyl vinyl ether or cyclohexyl vinyl ether; a functional group-containing vinyl ether such as hydroxyethyl vinyl ether or hydroxybutyl vinyl ether; or a fluorinated vinyl ether such as heptafluoropentyl vinyl ether.

In a case where the vinyl ether (3) is used, a copolymer (B) is obtained wherein a vinyl ether of either one of the vinyl ether (2) and the vinyl ether (3), and the fluorinated olefin (1) are alternately copolymerized. The vinyl ether (2) and the vinyl ether (3) are substantially equal in the polymerization reactivity, and therefore, it is a question of probability that both sides of a polymerized unit based on the fluorinated olefin (1) in the copolymer (B) become either a repeating unit based on the vinyl ether (2) or a repeating unit based on the vinyl ether (3). In a case where the vinyl ether (3) is used, no substitution reaction takes place at repeating units based on the vinyl ether (3) in the copolymer (B). Therefore, by adjusting the ratio of the vinyl ether (2) to the vinyl ether (3), it is possible to adjust the proportion of repeating units based on vinyl alcohol in the copolymer (A) after the step (2). Thus, by adjusting the amount of hydroxy groups in the copolymer (A), it is possible to adjust the hydrophilicity of the copolymer (A).

In a case where no vinyl ether (3) is used, the molar ratio ((1)/(2)) of the fluorinated olefin (1) to the vinyl ether (2) to be used for the copolymerization, is preferably from 40/60 to 60/40, particularly preferably 50/50. When the molar ratio ((1)/(2)) is within the above range, it is possible to readily obtain an alternate copolymer having the fluorinated olefin (1) and the vinyl ether (2) alternately copolymerized.

Further, in a case where the vinyl ether (3) is used, the molar ratio ((1)/((2)+(3))) of the fluorinated olefin (1) to the total of the vinyl ether (2) and the vinyl ether (3) to be used for the copolymerization, is preferably from 40/60 to 60/40, particularly preferably 50/50. When the molar ratio ((1)/((2)+(3))) is within the above range, it is possible to readily obtain an alternate copolymer having the fluorinated olefin (1) and the vinyl ether (2) or the vinyl ether (3) alternately copolymerized. Further, in such a case, the molar ratio ((2)/(3)) of the vinyl ether (2) to the vinyl ether (3) is preferably 45/5 to 10/40, particularly preferably from 40/10 to 25/25.

In the production process of the present invention, the aqueous medium is preferably water from the viewpoint of availability.

In the production process of the present invention, as the emulsifier, various surfactants such as a cationic surfactant, an anionic surfactant or a nonionic surfactant may be used. Among them, the anionic surfactant such as a sulfonic acid surfactant, a carboxylic acid surfactant or a phosphoric acid ester surfactant is preferred.

The sulfonic acid surfactant may, for example, be sodium lauryl sulfate or sodium dodecylbenzene sulfonate.

As the carboxylic acid surfactant, from the viewpoint of the affinity to the fluorinated olefin (1), a fluorinated carboxylic acid surfactant is more preferred, and from the viewpoint of availability, a compound represented by the following formula (4) is particularly preferred:

$$R^7-(CH_2)_n-COOX^2 \quad (4)$$

(wherein $R^7$ is a $C_{1-9}$ g perfluoroalkyl group which may have an oxygen atom, n is an integer of from 0 to 2, $X^2$ is a hydrogen atom, $NH_4$ or an alkali metal atom.)

From the viewpoint of forming an excellent micelle structure, the carbon number of $R^7$ is preferably from 5 to 9. Further, from the viewpoint of an effect of preventing a chain transfer reaction in the polymerization, n is preferably 0. $X^2$ is preferably a hydrogen atom or $NH_4$, particularly preferably $NH_4$.

As the emulsifier, ammonium perfluorooctanoate, $F(CF_2)_2OCF_2CF_2OCF_2COONH_4$, $F(CF_2)_3OCF_2CF_2OCF_2COONH_4$ or $F(CF_2)_4OCF_2CF_2OCF_2COONH_4$ is preferred.

The amount of the emulsifier to be used can be appropriately changed, depending on its type, reaction conditions, etc. In a case where the vinyl ether (3) is not used, the amount of the emulsifier is preferably from 0.005 to 5 mass %, particularly preferably from 0.1 to 5 mass %, per the total mass of the fluorinated olefin (1) and the vinyl ether (2). In a case where the vinyl ether (3) is used, the amount of the emulsifier is preferably from 0.005 to 5 mass %, particularly preferably from 0.1 to 5 mass %, per the total mass of the fluorinated olefin (1), the vinyl ether (2) and the vinyl ether (3). When the amount of the emulsifier is at least the above lower limitation, the stable emulsion state can be formed, and when the amount of the emulsifier is at most the above upper limitation, an emulsion is free from bubbling intensively, and thereby the polymerization can be stably carried out.

In the production process of the present invention, step (1) is carried out by adding a radical polymerization initiation source and as the case requires, a basic compound, to the reaction system. The radical polymerization initiation source may, for example, be a radical polymerization initiator or ionization radiation.

As the radical polymerization initiator, an aqueous initiator which is appropriate for emulsion polymerization is preferred. As the aqueous initiator, an organic peroxide such as (3-carboxypropionyl) peroxide (HOC(=O)CH$_2$CH$_2$C(=O)OOC(=O)CH$_2$CH$_2$C(=O)OH) or bis(4-carboxybutyryl) peroxide (HOC(=O)CH$_2$CH$_2$CH$_2$C(=O)OOC(=O)CH$_2$CH$_2$CH$_2$C(=O)OH) or ammonium persulfate, or an inorganic peroxide such as potassium persulfate may be used solely or in combination. Further, a redox initiator composed of a combination of the above persulfate and a reducing agent such as sodium hydrogen sulfite or sodium thiosulfate and an inorganic initiator having a small amount of iron, a ferrous salt or silver nitrate incorporated to the above redox initiator may be mentioned. Among the above radical polymerization initiators, from the viewpoint of handling efficiency, the inorganic peroxide is preferred, and ammonium persulfate is particularly preferred. As the radical polymerization initiator, one type may be used alone, or two or more types may be used in combination. Further, the full amount of the radical polymerization initiator may be added at the initial stage of the reaction, or the radical polymerization initiator may be added intermittently or continuously in the reaction.

The amount of the radical polymerization initiator may be suitably changed depending upon the type, polymerization conditions, etc. When the vinyl ether (3) is not used, the amount of the radical polymerization initiator is preferably from 0.005 to 5 mass %, particularly preferably from 0.05 to 0.5 mass %, per the total amount of the fluorinated olefin (1) and the vinyl ether (2). When the vinyl ether (3) is used, the amount of the radical polymerization initiator is preferably from 0.005 to 5 mass %, particularly preferably from 0.05 to 0.5 mass %, per the total amount of the fluorinated olefin (1), the vinyl ether (2) and the vinyl ether (3).

The copolymerization reaction may be carried out under a basic condition or an acidic condition. In the case of the acidic condition, as compared with the basic condition, isomerization, decomposition or cationic homopolymerization is likely to undergo. Therefore, with the view to carrying out the polymerization stably, it is preferred to carry out the radical polymerization under a basic condition, and it is particularly preferred to add a basic compound in the reaction system so as the reaction system to be basic, for example so as pH of an aqueous phase be from 8 to 9.

The basic compound is preferably an aqueous inorganic compound which is suitable to the emulsion polymerization. For example, an alkali metal salt or an ammonium salt of carbonic acid or phosphoric acid may be mentioned. From the viewpoint of availability, sodium carbonate, disodium hydrogen carbonate, potassium carbonate, dipotassium hydrogen carbonate, ammonium carbonate, sodium phosphate, disodium hydrogen phosphate, sodium dihydrogen phosphate, potassium phosphate, dipottasium hydrogen phosphate, potassium dihydrogen phosphate, ammonium phosphate or the like is preferred. As the basic compound, one type may be used alone, or two or more types may be used in combination.

The amount of the basic compound may be suitably changed depending upon the type, polymerization conditions, etc. When the vinyl ether (3) is not used, the amount of the basic compound is preferably from 0.005 to 5 mass %, particularly preferably from 0.1 to 5 mass % per the total mass of the fluorinated olefin (1) and the vinyl ether (2). When the vinyl ether (3) is used, the amount of the basic compound is preferably from 0.005 to 5 mass %, particularly preferably from 0.1 to 5 mass % per the total mass of the fluorinated olefin (1), the vinyl ether (2) and the vinyl ether (3).

The copolymerization may be carried out by any one of a batch system, a continuous system and a semicontinuous system. Further, with respect to the reaction temperature of the copolymerization reaction, the optimum value may suitably be selected depending upon the polymerization initiation source, and it is preferably from 5 to 95° C. Likewise, the polymerization pressure may suitably be selected depending upon the polymerization initiation source, and it is preferably from 0.1 to 10 MPa, particularly preferably from 0.2 to 3 MPa. The reaction time of the copolymerization reaction is preferably from 1 to 24 hours, particularly preferably from 2 to 12 hours.

In order to adjust the molecular weight of the copolymer (B), a chain transfer agent may be further added.

According to the process of the present invention, the copolymer (B) having a high molecular weight can be obtained. The weight average molecular weight (Mw) of the copolymer (B) is preferably from 50,000 to 1,000,000, more preferably from 85,000 to 1,000,000, further preferably from 85,000 to 700,000, particularly preferably from 85,000 to 500,000. If Mw of the copolymer (B) is at least the above lower limitation, entanglement of molecules can be sufficiently maintained, and a strong film or a strong sheet can be easily formed. On the other hand, when Mw of the copolymer (B) is at most the above upper limitation, the flowability at the time of forming can be maintained, and a uniform film or a uniform sheet can be easily formed. The weight average molecular weight (Mw) can be measured by GPC using a polystyrene standard.

The molecular weight distribution (Mw/Mn) of the copolymer (B) is preferably from 1 to 5. When Mw/Mn of the copolymer (B) is at most the above upper limitation, gelated products are little, and a film having a higher strength can be formed.

The molar ratio of repeating units in the copolymer (B) is as described below.

In a case where the vinyl ether (3) is not used, the molar ratio of repeating units based on the fluorinated olefin (1) to repeating units based on the vinyl ether (2) (repeating units based on the fluorinated olefin (1))/(repeating units based on the vinyl ether (2)) is preferably from 40/60 to 60/40, particularly preferably 50/50.

Further, in a case where the vinyl ether (3) is used, the molar ratio of repeating units based on the fluorinated olefin (1) to the total of repeating units based on the vinyl ether (2) and repeating units based on the vinyl ether (3) (repeating units based on the fluorinated olefin (1)/(repeating units based on the vinyl ether (2)+repeating units based on the vinyl ether (3)) is preferably from 40/60 to 60/40, particularly preferably 50/50. Further, in such a case, the molar ratio of repeating units based on the vinyl ether (2) to repeating units based on the vinyl ether (3) (repeating units based on the vinyl ether (2)/repeating units based on the vinyl ether (3)) is preferably from 45/5 to 10/40, particularly preferably from 40/10 to 25/25.

(Step (2))

Step (2) is a step of substituting by a hydrogen atom, $R^1$ in repeating units based on the vinyl ether (2) in the copolymer (B) obtained in the above-mentioned step (1) to obtain a fluorinated olefin/vinyl alcohol copolymer. Thus, the repeating units based on the vinyl ether (2) are converted to repeating units based on a vinyl alcohol, whereby a copolymer (A) having the repeating units based on the fluorinated olefin (1) and the repeating units based on the vinyl alcohol can be obtained. In a case where (B) has repeating units based on the vinyl ether (3), $R^6$ in the repeating units based on the vinyl ether (3) is maintained as it is without being converted, whereby a copolymer (A) having the repeating units based on the fluorinated olefin (1), the repeating units based on the vinyl alcohol and the repeating units based on the vinyl ether (3) can be obtained.

As a method for substituting $R^1$ by a hydrogen atom, a method using an acid, heat or light may be employed. Among them, it is preferred to substitute $R^1$ by a hydrogen atom with an acid, since it is thereby easy to prevent coloration of the obtainable copolymer (A). The acid may, for example, be an inorganic acid such as sulfuric acid, hydrochloric acid or nitric acid, or an organic acid such as acetic acid, butyric acid or trifluoroacetic acid.

The reaction with an acid may be carried out in an aqueous system or in a non-aqueous system. For example, (1) a reaction in a mixed solution of sulfuric acid/ethanol/water, (2) a reaction in a mixed solution of hydrochloric acid/dioxane or (3) a reaction in a mixed solution of trifluoroacetic acid/methylene chloride, is preferred.

Further, the reaction with an acid may be carried out by using a photo-acid-generator which generates an acid under irradiation with light. Such a photo-acid-generator may, for example, be an onium salt, a halogenated compound, a diazoketone compound, a sulfone compound or a sulfonic acid compound. A specific example may, for example, be diphenyl iodonium triflate, triphenyl sulfonium triflate, phenyl-bis (trichloromethyl)-s-triazine, methoxyphenyl-bis(trichloromethyl)-s-triazine, 4-trisphenancyl sulfone or 1,8-naphthalenedicarboxylic acid imide triflate.

In step (2), depending upon a particular application of the copolymer, the reaction may be terminated halfway before all of $R^1$ in the copolymer (B) are substituted, to obtain the copolymer (A) having repeating units based on the vinyl ether (2). By adjusting the ratio of repeating units based on the vinyl ether (2) to repeating units based on the vinyl alcohol by terminating the substituting reaction halfway, it is possible to adjust the hydrophilicity, crystallinity, etc. of the obtainable copolymer (A).

[Fluorinated Olefin/Vinyl Alcohol Copolymer]

The copolymer (A) obtained by the production process of the present invention comprises repeating units based on the fluorinated olefin (1) and repeating units based on the vinyl alcohol and as a care requires, repeating units based on the vinyl ether (2) and further repeating units based on the vinyl ether (3). The copolymer (A) has a high molecular weight and preferably has a weight average molecular weight (Mw) of from 50,000 to 1,000,000, more preferably from 85,000 to 1,000,000, further preferably from 85,000 to 700,000, particularly preferably from 85,000 to 500,000. Further, the alternating copolymerization ratio of the repeating units based on the fluorinated olefin (1) and the repeating units based on the vinyl alcohol is at least 95% as calculated by probability calculation from their copolymerization reactivity ratio.

The copolymer (A) is free from coloration, as is different from conventional copolymers obtained by copolymerizing a fluorinated olefin and vinyl acetate, followed by hydrolyzing. Further, particularly in a case where a reaction of substituting $R^1$ by a hydrogen atom in step (2) is carried out in the presence of an acid, the reaction quickly proceeds, whereby the productivity is high. The above factor is considered to be such that the etheric oxygen atom of the vinyl ether (2) is likely to more readily undergo protonation than the vinyl ester group of vinyl acetate.

Further, since a fluorinated olefin/vinyl alcohol copolymer obtained by a conventional production process using vinyl acetate is a random copolymer therefor, in such a fluorinated olefin/vinyl alcohol copolymer, the properties are non-uniform as between portions where the proportion of repeating units based on the fluorinated olefin is high and portions where the proportion of repeating units based on vinyl alcohol is high, and accordingly, the water resistance and heat resistance are low. Whereas, according to the process of the present invention, the fluorinated olefin (1) and the vinyl ether (2) or the vinyl ether (3) are substantially alternately polymerized, whereby hydroxy groups are not concentrated at specific sites, and it is possible to prevent that hydrophilicity of specific portions becomes extremely high, and excellent water resistance can be easily obtained. Further, in the copolymer (A), the repeating units based on the vinyl alcohol are not concentrated at specific sites, whereby excellent heat resistance can be obtained.

For example, in a case where the copolymer (A) is used as a coating material, it is possible to form a coating film having hydroxy groups uniformly arranged. Further, from a composition comprising the copolymer (A) and a curing agent such as melamine or isocyanate reactive with hydroxy groups, it is possible to form a film or coating film made of a cured product having a uniformly crosslinked structure. In such a case, it is also possible to obtain such an effect that by uniformly distributing hydroxy groups, the reactivity of hydroxy groups can be constantly obtained. Further, in a case where a curing agent is employed as mentioned above, timing for carrying out step (2) is not particularly limited, and for example, a composition obtained by mixing the copolymer (B), a component such as an acid to be used for step (2) and a curing agent, etc. is formed into a film or sheet and then light or heat is applied to form hydroxy groups to obtain a film or sheet made of a cured product having a crosslinked structure. That is, in such a case, the vinyl ether moieties in the copolymer (B) may be used as potential curing moieties.

Since the copolymer (A) has a high molecular weight, entanglement of molecular chains are sufficiently maintained, and a strong film can be formed. Further, it is possible to obtain a formed product which is excellent in the mechanical properties and the chemical resistance, and for example, such a formed product can be formed into a tube or a sheet. Further, by applying the copolymer (A) to another material, a material of which the surface is modified can be provided. Since the copolymer (A) is an alternating copolymer, an excellent coating solution of which the distribution of the composition is small and molten residue is little can be obtained. Further, since a coating film to be obtained has a high molecular weight, a surface of another material which is a base material can be sufficiently covered, and the surface can be appropriately modified.

[Process for Producing a Film]

As described above, the copolymer (A) can be used for various applications, however, from the viewpoint of excellent properties of a thin film, a film is particularly useful. The thickness of the film is preferably from 10 μm to 5 mm, more preferably from 20 μm to 1 mm, particularly preferably from 20 to 500 μm. A film can be made from a composition containing the copolymer (A). The composition may contain a compound which not impairs the properties of the copolymer (A), in addition to the copolymer (A). For example, inorganic fine particles, an antioxidant, etc. may be mentioned.

As a method for forming a film from the composition, a known method such as a spin coating method, a cast method, a press method or a melt extrusion method may be mentioned. Among them, since a film having high uniformity of the film thickness, an excellent optical transparency and few contaminates can be obtained, the cast method is preferred. As a solvent used for the cast method, a compound which dissolves the compound (A) is preferred. A solvent such as an alcohol, an ether, a ketone, an ester or an amide may be mentioned. From the viewpoint of a transparency of a self-supporting film to be obtained, the alcohol is preferred, and methanol or ethanol is particularly preferred. Further, as the solvent, one type may be solely used, or two or more may be used in combination. When at least two solvents are used in combination, so long as a fluorinated olefin/vinyl alcohol copolymer can be dissolved in a mixed solvent, a compound in which the fluorinated olefin/vinyl alcohol copolymer is not dissolved, may be used. The solvent is preferably used in an amount of from 60 to 99 mass % per the copolymer (A).

EXAMPLES

Now, the present invention will be described in detail with reference to Examples and Comparative Examples. However, it should be understood that the present invention is by no means restricted by the following description.

[Measuring Methods]

Each measuring method used in Examples is described below.

(Weight Average Molecular Weight (Mw), Number Average Molecular Weight (Mn), Molecular Weight Distribution (Mw/Mn))

The average molecular weight (Mw), the number average molecular weight (Mn) and the molecular weight distribution (Mw/Mn) of a copolymer obtained in each Example were measured by gel permeation chromatography (GPC) using a high speed GPC apparatus "HLC-8220GPC" manufactured by Tosoh Corporation wherein Their values are calculated values using polystyrene. As the eluent, tetrahydrofuran was used.

(Structure and Composition of Copolymers)

The structure and the composition of a copolymer in each example was identified from the measurements of the $^1$H-NMR and $^{19}$F-NMR spectra.

(Thermal Properties of Copolymers)

The glass transition temperature (Tg) of the copolymer obtained in each Example was measured by using a differential scanning calorimeter "Q-100" manufactured by TA Instruments Japan Inc, and the 10% weight reduction temperature ($Td_{10}$) was measured by a differential thermal balance mass spectrometry simultaneous measurement equipment "TG-DTA 2000SA", manufactured by Bruker AXS K.K.

Example 1

Preparation of a Copolymer (A1) and Films

Step (1)

Into a stainless steel autoclave having an internal capacity of 1 L and equipped with a stirrer (pressure resistance: 3.4 MPaG), 500.0 g of ion-exchanged water, 125.0 g of t-butyl vinyl ether (hereinafter referred to as "TBVE") as the vinyl ether (2), 2.5 g of ammonium perfluorooctanoate (hereinafter referred to as "APFO") as an emulsifier, 9.1 g of disodium hydrogen phosphate and 5.0 g of ammonium persulfate (hereinafter referred to as "APS") were charged, followed by carrying out freezing deaeration with liquid nitrogen to remove oxygen in the system.

Then, 126.5 g of tetrafluoroethylene (hereinafter referred to as "TFE") as the fluorinated olefin (1) was introduced into the autoclave, followed by heating to 50° C. The pressure at that time was 2.43 MPaG. Then, the reaction was continued for 7.5 hours, and when the pressure decreased to 1.09 MPaG, the autoclave was cooled with water, and non-reacted gas was purged to terminate the reaction. The obtained polymer solution was put into methanol to precipitate the formed copolymer (B1), followed by vacuum drying. The yield of the copolymer (B1) was 69.0 g, and the reactivity of the monomers was 28%.

The obtained copolymer (B1) had Mw of 136,000, Mn of 65,000 and Mw/Mn of 2.1. From $^1$H-NMR spectrum and $^{19}$F-NMR spectrum, the copolymer compositional ratio was TFE/TBVE=49/51 (mol %). Further, by a calculation from the copolymerization reactivity ratio of both monomers, it was found to have a substantially alternating structure (alternating copolymerization ratio: at least 95%).

(Step (2))

4.0 g of the copolymer (B1), 4.0 g of 36 wt % concentrated hydrochloric acid and 52 g of ethanol were put into a 100 mL flask, heated and stirred at an internal temperature of 78° C. to carry out a substitution reaction. The reaction was continued for 8 hours, and then, the reaction solution was dropped into water to precipitate a copolymer, and the copolymer was washed with water and then vacuum-dried at 90° C. to obtain 2.5 g of a copolymer (A1). In this step, coloration was not observed.

It is evident from results of H-NMR spectrum and $^{19}$F-NMR measurements of the copolymer (B1) and the copolymer (A1) that at least 99% of $R^1$ (t-butyl group) was substituted by hydrogen atoms by the deprotection, hydroxy groups were formed in the copolymer (A1) (a repeating unit in which $R^1$ is substituted by a hydrogen atom is referred to as "VAI"), the copolymerization composition ratio was TFE/VAI=46/54 (mol %), Mw was 110,000, Mn was 39,000, and Mw/Mn=2.8. Further, Tg was 90° C., and $Td_{10}$ was 394° C.

(Production of a Film and its Evaluation)

1.0 g of the copolymer (A1) was added in a container in which 9.0 g of ethanol was added, and the copolymer (A1) was dissolved to obtain a solution. The solution was filtrated by a membrane filter made of a polytetrafluoroethylene, and then a film having a thickness of 113 μm and a film having a thickness of 130 μm were obtained by means of a cast method. The obtained films were subjected to the tensile test, the measurement of oxygen gas permeability and the measurement of water-vapor permeability.

(a) Tensile Test

A sample having a length of 5 cm for tensile test was prepared from the obtained film having a thickness of 130 μm, and the tensile test was carried out by using a compact tabletop tester (EZ Test) manufactured by Shimadzu Corporation at a temperature of 25° C. at a rate of 10 mm/min. The elastic modulus was 1.589 GPa, and the elongation at break was 18%.

(b) Oxygen Gas Permeability

The oxygen gas permeability of the obtained film having a thickness of 130 μm was measured by using a gas permeability measuring equipment (K-315N) manufactured by Tsukuba Rika Seiki at a temperature of 40° C. The measured value was $1.65 \times 10^{-12}$ cc (STP) cm/cm$^2$·sec·cmHg.

(c) Water Vapor Permeability

The water vapor permeation coefficient of the obtained film having a thickness of 113 μm was measured by using gas permeability measuring equipment (PERMATRAN W3/33) manufactured by MOCON in accordance with the measurement standard of JIS K7129B at a temperature of 40° C. and at a humidity of 90% RH. The measured value was 4.29 g·mm/m$^2$·day.

Example 2

Preparation of a Copolymer (A2) and Films

A copolymer (A2) was obtained by using a chlorotrifluoroethylene (hereinafter referred to as "CTFE") as the fluorinated olefin (1).

(Step (1))

Into a stainless steel autoclave having an internal capacity of 0.2 L and equipped with a stirrer (pressure resistance: 5.0 MPaG), 100.0 g of ion-exchanged water, 23.0 g of TBVE as the vinyl ether (2), 0.5 g of APFO, 1.8 g of disodium hydrogen phosphate and 1.0 g of APS were charged, followed by carrying out freezing deaeration with liquid nitrogen to remove oxygen in the system.

Then, 30.6 g of CTFE as the fluorinated olefin (1) was introduced into the autoclave, followed by heating to 50° C. The pressure at that time was 0.40 MPaG. Then, the reaction was continued for 7.5 hours, and when the pressure decreased to 0.31 MPaG, the autoclave was cooled with water, and non-reacted gas was purged to terminate the reaction. The obtained polymer solution was put into methanol to precipitate the formed copolymer (B2), followed by vacuum drying. The yield of the copolymer (B2) was 37.0 g, and the reactivity of the monomers was 73%.

The obtained copolymer (B2) had Mw of 105,000, Mn of 30,000 and Mw/Mn of 3.50. From $^1$H-NMR spectrum and $^{19}$F-NMR spectrum, the copolymer compositional ratio was CTFE/TBVE=49/51 (mol %). Further, by a calculation from the copolymerization reactivity ratio of both monomers, it was found to have a substantially alternating structure (alternating copolymerization ratio: at least 95%).

(Step (2))

4.0 g of the copolymer (B2), 4.0 g of 36 wt % concentrated hydrochloric acid and 52 g of ethanol were put into a 100 mL flask, heated and stirred at an internal temperature of 78° C. to carry out a deprotection reaction. The reaction was continued for 8 hours, and then, the reaction solution was dropped into water to precipitate a copolymer, and the copolymer was washed with water and then vacuum-dried at 90° C. to obtain 3.0 g of a copolymer (A2). In this step, coloration was not observed.

It is evident from results of $^1$H-NMR spectrum and $^{19}$F-NMR measurements of the copolymer (B2) and the copolymer (A2) that at least 99% of $R^1$ (t-butyl group) was substituted by hydrogen atoms by the deprotection, hydroxy groups were formed in the copolymer (A2), the copolymerization composition ratio was CTFE/VAI=49/51 (mol %), Mw was 87,000, Mn was 29,000, and Mw/Mn=3.0.

(Production of Films and Evaluations)

A film having a thickness of 45 μm and a film having a thickness of 72 μm were obtained in the same manner as in Example 1, except that the copolymer (A2) was used instead of the copolymer (A1). The oxygen gas permeability of the film having a thickness of 72 μm and the water vapor permeability of the film having a thickness of 45 μm were measured in the same manner as in Example 1. The oxygen gas permeability was $4.73 \times 10^{-12}$ cc (STP) cm/cm$^2$·sec·cmHg, and the water vapor permeability was 1.41 g·mm/m$^2$·day.

Example 3

Preparation of a Copolymer (A5)

(Step (1))

Into a stainless steel autoclave having an internal capacity of 1 L and equipped with a stirrer (pressure resistance: 3.4 MPaG), 500.0 g of ion-exchanged water, 125.0 g of TBVE, 3.8 g of APFO, 28.3 g of disodium hydrogen phosphate and 10.0 g of APS were charged. An operation of increasing the internal pressure of the autoclave with nitrogen to 0.5 MPaG and purging to 0.05 MPaG was repeated 10 times to remove oxygen in the system.

Then, 95 g of TFE as the fluorinated olefin (1) was introduced into the autoclave until the inside of the autoclave became 1.7 MPaG, followed by heating to 30° C. After the internal temperature reached 30° C., 2.5 mL of a sodium hydrogen sulfite aqueous solution (concentration: 0.11 g/mL) as a reducing agent was added to initiate a reaction. After initiating the reaction, TFE was continuously supplied in the autoclave, and 2.5 mL of a sodium hydrogen sulfite aqueous solution (concentration: 0.11 g/mL) was added in the autoclave at intervals of 15 minutes. After 6.5 hours from the initiation of the reaction, the autoclave was cooled with water. The total added amount of TFE was 164.0 g, and the total added amount of the sodium hydrogen sulfite aqueous solution (concentration: 0.11 g/mL) was 65 mL. The autoclave was cooled to room temperature (from 20 to 25° C.), and then non-reacted gas was purged to terminate the reaction. The obtained polymer solution was put into methanol to precipitate the formed copolymer (B5), followed by vacuum drying. The yield of the copolymer (B5) was 136.0 g, and the reactivity of the monomers was 56%.

The obtained copolymer (B5) had Mw of 324,000, Mn of 178,000 and Mw/Mn of 1.8. From $^1$H-NMR spectrum and $^{19}$F-NMR spectrum, the copolymer compositional ratio was TFE/TBVE=49/51 (mol %). Further, by a calculation from the copolymerization reactivity ratio of both monomers, it was found to have a substantially alternating structure (alternating copolymerization ratio: at least 95%).

(Step (2))

126 g of the copolymer (B5), 125 g of 36 wt % concentrated hydrochloric acid and 810 g of ethanol were put into a 100 mL flask, heated and stirred at an internal temperature of 78° C. to carry out a substitution reaction. The reaction was continued for 8 hours, and then, the reaction solution was dropped into water to precipitate a copolymer, and the copolymer was washed with water and then vacuum-dried at 90° C. to obtain 89 g of a copolymer (A5). In this step, coloration was not observed.

It is evident from results of $^1$H-NMR spectrum and $^{19}$F-NMR measurements of the copolymer (B5) and the copolymer (A5) that at least 99% of $R^1$ (t-butyl group) was substituted by hydrogen atoms by the deprotection, hydroxy groups were formed in the copolymer (A5), the copolymerization composition ratio was TFE/VAI=47/53 (mol %), Mw was 341,000, Mn was 147,000, and Mw/Mn=2.3. Further Tg was 90° C., and Td$_{10}$ was 412° C.

Example 4

Preparation of a Copolymer (A6)

(Step (1))

Into a stainless steel autoclave having an internal capacity of 1 L and equipped with a stirrer (pressure resistance: 3.4 MPaG), 500.0 g of ion-exchanged water, 125.0 g of TBVE, 2.5 g of APFO, 28.3 g of disodium hydrogen phosphate and 10.0 g of APS were charged. An operation of increasing the internal pressure of the autoclave with nitrogen to 0.5 MPaG and purging to 0.05 MPaG was repeated 10 times to remove oxygen in the system.

Then, 102 g of TFE as the fluorinated olefin (1) was introduced into the autoclave until the inside of the autoclave became 1.7 MPaG, followed by heating to 30° C. After the internal temperature reached 30° C., 2.5 mL of a sodium hydrogen sulfite aqueous solution (concentration: 0.11 g/mL) as a reducing agent was added to initiate a reaction. After initiating the reaction, TFE was continuously supplied in the autoclave, and 2.5 mL of a sodium hydrogen sulfite aqueous solution (concentration: 0.11 g/mL) was added in the autoclave at intervals of 15 minutes. After 6.5 hours from the initiation of the reaction, the autoclave was cooled with water. The total added amount of TFE was 154.0 g, and the total added amount of the sodium hydrogen sulfite aqueous solution (concentration: 0.11 g/mL) was 65 mL. The autoclave was cooled to room temperature, and then non-reacted gas was purged to terminate the reaction. The obtained polymer solution was put into methanol to precipitate the formed copolymer (B6), followed by vacuum drying. The yield of the copolymer (B6) was 85.0 g, and the reactivity of the monomers was 34%.

The obtained copolymer (B6) had Mw of 258,000, Mn of 114,000 and Mw/Mn of 2.3. From $^1$H-NMR spectrum and $^{19}$F-NMR spectrum, the copolymer compositional ratio was TFE/TBVE=48/52 (mol %). Further, by a calculation from the copolymerization reactivity ratio of both monomers, it was found to have a substantially alternating structure (alternating copolymerization ratio: at least 95%).
(Step (2))

82 g of the copolymer (B6), 82 g of 36 wt % concentrated hydrochloric acid and 780 g of ethanol were put into a 1,000 mL flask, heated and stirred at an internal temperature of 78° C. to carry out a substitution reaction. The reaction was continued for 8 hours, and then, the reaction solution was dropped into water to precipitate a copolymer, and the copolymer was washed with water and then vacuum-dried at 90° C. to obtain 57 g of a copolymer (A6). In this step, coloration was not observed.

It is evident from results of $^1$H-NMR spectrum and $^{19}$F-NMR measurements of the copolymer (B6) and the copolymer (A6) that at least 99% of $R^1$ (t-butyl group) was substituted by hydrogen atoms by the deprotection, hydroxy groups were formed in the copolymer (A6), the copolymerization composition ratio was TFE/VAI=48/52 (mol %), Mw was 271,000, Mn was 117,000, and Mw/Mn=2.3. Further, Tg was 90° C., and $Td_{10}$ was 397° C.
(Production of a Film and its Evaluation)

3.0 g of the copolymer (A6) was added in a container in which 27.0 g of ethanol was added, and the copolymer (A6) was dissolved to obtain a solution. The solution was filtrated by a membrane filter made of a polytetrafluoroethylene, and then a film having a thickness of 52 μm was obtained by means of a cast method. The obtained films were subjected to the tensile test.
(a) Tensile Test A sample having a length of 6.3 cm for tensile test was prepared from the obtained film having a thickness of 52 μm, and the tensile test was carried out by using a Tensilon universal testing machine (model: RTC-1210, manufactured by A&D Company, Limited) at a temperature of 25° C. at a humidity of 50% at a rate of 10 mm/min. The elastic modulus was 1.8 GPa, the stress at the maximum point was 94 MPa, and the elongation at break was 202%. Thus, a strong film was formed.

Reference Example 1

Preparation of a Copolymer (A3) and Films

Into a stainless steel autoclave having an internal capacity of 1 L and equipped with a stirrer (pressure resistance: 3.4 MPaG), 317.0 g of t-butyl alcohol, 109.0 g of TBVE as the vinyl ether (2), 1.0 g of potassium carbonate and 2.7 g of a 50% 1,1,1,2,2,3,3,4,4,5,5,6,6-tridecafluorohexane solution of t-butylperoxypivarate (hereinafter referred to as "PBPV") were charged, followed by carrying out freezing deaeration with liquid nitrogen to remove oxygen in the system.

Then, 112.7 g of TFE as the fluorinated olefin (1) was introduced into the autoclave, followed by heating to 55° C. The pressure at that time was 1.62 MPaG. Then, the reaction was continued for 8.0 hours, and when the pressure decreased to 0.86 MPaG, the autoclave was cooled with water, and non-reacted gas was purged to terminate the reaction. The obtained polymer solution was put into methanol to precipitate the formed copolymer (B3), followed by vacuum drying. The yield of the copolymer (B3) was 121.4 g, and the reactivity of the monomers was 55%.

The obtained copolymer (B3) had Mw of 36,000, Mn of 24,000 and Mw/Mn of 1.7. From $^1$H-NMR spectrum and $^{19}$F-NMR spectrum, the copolymer compositional ratio was TFE/TBVE=51/49 (mol %). Further, by a calculation from the copolymerization reactivity ratio of both monomers, it was found to have a substantially alternating structure (alternating copolymerization ratio: at least 95%).

Then, 4.0 g of the copolymer (B3), 4.0 g of 36 wt % concentrated hydrochloric acid and 52 g of ethanol were put into a 100 mL flask, heated and stirred at an internal temperature of 78° C. to carry out a deprotection reaction. The reaction was continued for 8 hours, and then, the reaction solution was dropped into water to precipitate a copolymer, and the copolymer was washed with water and then vacuum-dried at 90° C. to obtain 2.5 g of a copolymer (A3).

It is evident from results of $^1$H-NMR spectrum and $^{19}$F-NMR of the copolymer (B3) and the copolymer (A3) that at least 99% of t-butyl group was substituted by hydrogen atoms by the deprotection, hydroxy groups were formed in the copolymer (A3), the copolymerization composition ratio was TFE/VAI=48/52 (mol %), Mw was 37,000, Mn was 21,000, and Mw/Mn=1.8.
(Production of Films and Evaluations)

It was tried to form films in the same manner as in Example 1, except that instead of the copolymer (A1), the copolymer (3) was used. However, formed membranes were very fragile and could not be formed into films. Since films were not obtained, the oxygen gas permeability and the water vapor permeability could not be measured.

Comparative Example 1

Preparation of a Copolymer (A4)

Into a stainless steel autoclave having an internal capacity of 1 L and equipped with a stirrer, 354 g of methyl acetate, 63 g of vinyl acetate (hereinafter referred to as "VAc") and 2.3 g of a 50% 1,1,1,2,2,3,3,4,4,5,5,6,6-tridecafluorohexane solution of PBPV were charged, followed by carrying out freezing deaeration with liquid nitrogen to remove oxygen in the system. Then, 179 g of TFE was introduced into the autoclave, followed by heating to 55° C. Then, the reaction was continued for 10 minutes, and then the autoclave was cooled with water, and then non-reacted gas was purged to terminate the reaction. The obtained polymer solution was put into methanol to precipitate the formed copolymer, followed by vacuum drying to obtain the copolymer (B4) as solid. The yield of the copolymer (B4) was 110 g, and the reactivity of the monomers was 45%.

The obtained copolymer (B4) had Mw of 278,000, Mn of 84,000 and Mw/Mn of 3.3. From $^1$H-NMR spectrum and $^{19}$F-NMR spectrum, the copolymer compositional ratio was TFE/VAc=50/50 (mol %). Further, by a calculation from the copolymerization reactivity ratio of both monomers, the alternating copolymerization ratio of the copolymer (B4) was from 80 to 85%.

Then, 4.1 g of the copolymer (B4), 4.0 g of 36 wt % concentrated hydrochloric acid and 52 g of ethanol were put into a 100 mL flask, heated and stirred at an internal temperature of 78° C. to carry out a deprotection reaction. The reaction was continued for 32 hours, and then, the reaction solution was dropped into water to precipitate a copolymer, and the copolymer was washed with water and then vacuum-dried at 90° C. to obtain 2.7 g of a copolymer (A4).

It is evident from results of $^1$H-NMR spectrum and $^{19}$F-NMR measurements of the copolymer (B4) and the copolymer (A4) that at least 99% of the acetyl groups was substituted by hydrogen atoms by the hydrolysis, hydroxy groups were formed. In the copolymer (A4), the copolymerization composition ratio was TFE/VAI=50/50 (mol %), Mw was 275,000, Mn was 74,000, and Mw/Mn=3.7. Further, Tg was 85° C., $Td_{10}$ was 379° C., and the copolymer (A4) had a lower decomposition temperature by about 20° C. than the copolymer (A1).

In Examples 1 to 4, according to the production process of the present invention, fluorinated olefin/vinyl alcohol copolymers having a high molecular weight and a high alternating copolymerization ratio could be obtained, whereby films having a high heat resistance and which is strong and excellent in the gas barrier property could be obtained. Particularly, the copolymer obtained in Example 4 had a high molecular weight, and thereby the elastic modulus of the film was higher than the film in Example 1, and the elongation at rupture was higher than the film in Example 1.

In Reference Example 1, the copolymer was obtained by solution polymerization, and thereby the molecular weight was lower than the molecular weight in Examples 1 and 2, and a film could not be formed.

In Comparative Example 1, vinyl acetate was used as a monomer, and thereby the alternating copolymerization was lower than in Examples 1 and 2, and the heat resistance was insufficient. It is considered that the main chain of the copolymer was decomposed.

INDUSTRIAL APPLICABILITY

In the production process of the present invention, copolymerization is carried out in emulsion state, whereby a fluorinated olefin/vinyl alcohol copolymer having a high molecular weight and a high alternating copolymerization ratio can be obtained. Since such a copolymer has a high molecular weight, a strong formed product, particularly a film can be formed. Such a film can be appropriately used as a film such as a filter, a gas barrier film, a hydrophilic porous film or a cell separator or a surface protective sheet material such as a backsheet for solar cells.

This application is a continuation of PCT Application No. PCT/JP2012/075852, filed on Oct. 4, 2012, which is based upon and claims the benefit of priority from Japanese Patent Application No. 2011-220920 filed on Oct. 5, 2011. The contents of those applications are incorporated herein by reference in its entirety.

What is claimed is:

1. A process for producing a fluorinated olefin/vinyl alcohol copolymer, comprising:
    (1): emulsion polymerizing a fluorinated olefin of formula (1) and a vinyl ether of formula (2) in an aqueous medium comprising an emulsifier to obtain a fluorinated olefin/vinyl ether copolymer, wherein the mass ratio of the vinyl ether of formula (2) to the aqueous medium is from 5/95 to 70/30:

$$CF_2=CFX^1 \quad (1)$$

$$CH_2=CHOR^1 \quad (2)$$

wherein
    in formula (1), $X^1$ is selected from the consisting of a fluorine atom, a chlorine atom, a trifluoromethyl group and $-OC_aF_{2a+1a}$ wherein a is an integer of from 1 to 3, and
    in formula (2), $R^1$ is a group selected from the group consisting of a $C_{4-12}$ tertiary alkyl, a $C_{4-12}$ tertiary alkoxy-alkyl group, a $C_{4-6}$ alicyclic hydrocarbon group which has an etheric oxygen atom, a $C_{6-10}$ aryl group and $-Si(R^5)_3$, wherein $R^5$ is a $C_{1-10}$ alkyl group or an aryl group,
    wherein said fluorinated olefin and said vinyl ether have an alternating copolymerization ratio of at least 95%; and
    (2): converting said fluorinated olefin/vinyl ether copolymer to a fluorinated olefin/vinyl alcohol copolymer by substituting $R^1$ with a hydrogen atom.

2. The process for producing a fluorinated olefin/vinyl alcohol copolymer according to claim 1, wherein $R^1$ is a t-butyl group.

3. The process for producing a fluorinated olefin/vinyl alcohol copolymer according to claim 1, wherein (2) is carried out in the presence of an acid.

4. The process for producing a fluorinated olefin/vinyl alcohol copolymer according to claim 1, wherein in the fluorinated olefin/vinyl ether copolymer obtained in (1), the molar ratio of the repeating units based on the fluorinated olefin represented by the formula (1) to the repeating units based on the vinyl ether represented by the formula (2) is from 40/60 to 60/40.

5. The process for producing a fluorinated olefin/vinyl alcohol copolymer according to claim 1, wherein in (1), a vinyl ether of formula (3) is further copolymerized:

$$CH_2=CHOR^6 \quad (3)$$

wherein $R^6$ is a group selected from the group consisting of an unsubstituted $C_{1-6}$ primary alkyl group, an unsubstituted $C_{1-6}$ secondary alkyl group, an unsubstituted $C_{6-12}$ cycloalkyl group, a $C_{1-6}$ primary alkyl group having at least one substituent, a $c_{1-6}$ secondary alkyl group having at least one substituent, and a $C_{6-12}$ cycloalkyl group having at least one substituent, wherein said substituent is a hydroxy group or a fluorine atom,
wherein said fluorinated olefin and said vinyl ether (2) and (3) have an alternating copolymerization ratio (1):((2)+(3)) of at least 95%.

6. The process for producing a fluorinated olefin/vinyl alcohol copolymer according to claim 1, wherein the emulsifier is a compound represented by formula (4):

$$R^7-(CH_2)_n-COOX^2 \quad (4)$$

wherein $R^7$ is a $C_{1-9}$ perfluoroalkyl group which may have an etheric oxygen atom, n is an integer of from 0 to 2, and $X^2$ is a hydrogen atom, $NH_4$ or an alkaline metal atom.

7. The process for producing a fluorinated olefin/vinyl alcohol copolymer according to claim 1, wherein (1) is carried out in the presence of a basic compound.

8. The process for producing a fluorinated olefin/vinyl alcohol copolymer according to claim 1, wherein the fluorinated olefin/vinyl alcohol copolymer has a weight average molecular weight of from 50,000 to 1,000,000.

9. A film made by forming a composition uprising the fluorinated olefin/vinyl alcohol copolymer obtained by the production process as defined in claim 1.

10. The film according to claim 9, wherein the forming is a casting method.

* * * * *